United States Patent
Bantukul et al.

(10) Patent No.: US 7,751,836 B2
(45) Date of Patent: Jul. 6, 2010

(54) METHODS, SYSTEMS, AND COMPUTER PROGRAM PRODUCTS FOR SHORT MESSAGE SERVICE (SMS) SPAM FILTERING USING E-MAIL SPAM FILTERING RESOURCES

(75) Inventors: Apirux Bantukul, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 373 days.

(21) Appl. No.: 11/224,295

(22) Filed: Sep. 12, 2005

(65) Prior Publication Data

US 2006/0079255 A1 Apr. 13, 2006

Related U.S. Application Data

(60) Provisional application No. 60/608,591, filed on Sep. 10, 2004.

(51) Int. Cl.
G06F 15/16 (2006.01)
(52) U.S. Cl. ...................... 455/466; 455/412.1; 709/206
(58) Field of Classification Search ............. 455/412.1, 455/412.2, 414.4, 432.2, 517, 466, 420, 67.11, 455/556.1; 709/206
See application file for complete search history.

(56) References Cited

U.S. PATENT DOCUMENTS

| 5,579,372 A | 11/1996 | Åstrom |
| 5,701,301 A | 12/1997 | Weisser, Jr. |
| 5,742,905 A | 4/1998 | Pepe et al. |
| 5,768,509 A | 6/1998 | Günlük |

(Continued)

FOREIGN PATENT DOCUMENTS

EP 1 377 909 11/2009

(Continued)

OTHER PUBLICATIONS

Commonly-assigned, co-pending U.S. Appl. No. 11/153,095 for "Methods, Systems, and Computer Program Products for Content-Based Screening of Messaging Service Messages," (Unpublished, filed Jun. 15, 2005).

(Continued)

Primary Examiner—George Eng
Assistant Examiner—Brandon J Miller
(74) Attorney, Agent, or Firm—Jenkins, Wilson, Taylor & Hunt, P.A.

(57) ABSTRACT

Methods, systems, and computer program products are disclosed for preventing the delivery of unwanted SMS messages, such as those containing unsolicited commercial messages or spam, in a communications network. More particularly, SMS messages are intercepted prior to delivery and at least a portion of the SMS message content is encapsulated within an electronic mail (e-mail) message. The e-mail message is communicated to an e-mail spam filtering resource in a data network, where spam screening/filtering algorithms are applied. The e-mail message is discarded at the e-mail spam filtering resource if the message fails spam screening. Alternatively, or in addition, the results of the spam screening may be returned with the original message for another network node to process accordingly. In any case, if the message passes spam screening, the original SMS message that is associated with the e-mail message may be delivered to/toward the intended message recipient.

40 Claims, 13 Drawing Sheets

U.S. PATENT DOCUMENTS

| | | | |
|---|---|---|---|
| 5,903,726 A | 5/1999 | Donovan et al. | |
| 5,930,239 A | 7/1999 | Turcotte | |
| 5,987,323 A | 11/1999 | Huotari | |
| 6,101,393 A | 8/2000 | Alperovich et al. | |
| 6,108,325 A | 8/2000 | Stephanson et al. | |
| 6,108,559 A | 8/2000 | Åström et al. | |
| 6,125,281 A | 9/2000 | Wells et al. | |
| 6,175,743 B1 | 1/2001 | Alperovich et al. | |
| 6,223,045 B1 | 4/2001 | Valentine et al. | |
| 6,259,925 B1 | 7/2001 | Josse | |
| 6,289,223 B1 | 9/2001 | Mukherjee et al. | |
| 6,301,484 B1 | 10/2001 | Rogers et al. | |
| 6,400,942 B1 | 6/2002 | Hansson et al. | |
| 6,418,305 B1 | 7/2002 | Neustein | |
| 6,563,830 B1 | 5/2003 | Gershon et al. | |
| 6,701,440 B1 | 3/2004 | Kim et al. | |
| 6,795,708 B1 | 9/2004 | Patel | |
| 6,819,932 B2 | 11/2004 | Allison et al. | |
| 6,865,191 B1 | 3/2005 | Bengtsson et al. | |
| 7,103,372 B1* | 9/2006 | Kupsh | 455/466 |
| 7,145,875 B2 | 12/2006 | Allison et al. | |
| 7,155,243 B2 | 12/2006 | Baldwin et al. | |
| 2001/0005678 A1 | 6/2001 | Lee | |
| 2001/0006897 A1 | 7/2001 | Kang et al. | |
| 2001/0041579 A1 | 11/2001 | Smith et al. | |
| 2002/0159387 A1 | 10/2002 | Allison et al. | |
| 2002/0187794 A1* | 12/2002 | Fostick et al. | 455/466 |
| 2003/0009698 A1 | 1/2003 | Lindeman et al. | |
| 2003/0083078 A1 | 5/2003 | Allison et al. | |
| 2003/0204568 A1* | 10/2003 | Bhargava et al. | 709/206 |
| 2004/0098460 A1* | 5/2004 | Hehl et al. | 709/206 |
| 2004/0203589 A1* | 10/2004 | Wang et al. | 455/410 |
| 2005/0020289 A1 | 1/2005 | Kim et al. | |
| 2005/0101306 A1 | 5/2005 | Zabawskyj et al. | |
| 2005/0186974 A1* | 8/2005 | Cai | 455/466 |
| 2005/0197142 A1* | 9/2005 | Major | 455/466 |
| 2005/0278620 A1 | 12/2005 | Baldwin et al. | |
| 2006/0041622 A1* | 2/2006 | Qutub et al. | 709/206 |
| 2006/0053203 A1* | 3/2006 | Mijatovic | 709/206 |

FOREIGN PATENT DOCUMENTS

| | | | |
|---|---|---|---|
| WO | WO 97/20442 | * | 6/1997 |
| WO | WO 99/27726 A | | 6/1999 |
| WO | WO 99/37066 A | | 7/1999 |
| WO | WO 03/026331 | | 3/2003 |
| WO | WO 2004/012470 | | 2/2004 |
| WO | WO 2004/059959 | | 7/2004 |
| WO | WO 2006/002076 | | 1/2006 |

OTHER PUBLICATIONS

Notification of Transmittal of International Preliminary Examination Report in International Application No. PCT/US02/06380 (Mar. 13, 2003).
Written Opinion in International Application No. PCT/US02/06380 (Nov. 27, 2002).
Notification of Transmittal of the International Search Report or the Declaration in International Application No. PCT/US02/06380 (Jun. 21, 2002).
"Camelot Messaging Security Suite v1.0," Atrium Software International, http://www.atrium-softwareusa.com/en/camelot/camelot_overview.html, pp. 1-3 (publication date unknown) (Web page copyright 1998-2002).
"Mercur SMS Pager Gateway," Atrium Software International, http://atrium-softwareusa.com/EN/mcrsmspager_products.html, p. 1 (publication date unknown) (Web page copyright 1998-2002).
"Wireless Application Protocol Architecture Specification WAP-210-WAPArch-20010712," WAP Architecture, Version 12, pp. 1-24 (Jul. 12, 2001).
J. Klensin, "Simple Mail Transfer Protocol," Network Working Group, pp. 1-79 (Apr. 2001).
Myers et al., "Post Office Protocol—Version 3," Network Working Group, http://www.ietf.org/rfc1939.txt, pp. 1-22 (May 1996).
Notification of Transmittal of the International Search Report and the Written Opinion of the International Searching Authority, or the Declaration in International Application No. PCT/US05/32370 (Sep. 12, 2005).
Communication Pursuant to Article 94(3) EPC for European Application No. 02748368.4 (Oct. 9, 2008).
Supplementary European Search Report for European Application No. 02748368.4 (Jun. 24, 2008).
Notification Concerning Transmittal of the International Preliminary Report on Patentability of International Application No. PCT/US2005/032370 (Mar. 22, 2007).
Notification of Transmittal of International Preliminary Examination Report for International Application No. PCT/US02/06185 (Jan. 30, 2007).
Notification Concerning Transmittal of International Preliminary Report on Patentability for International Application No. PCT/US2005/021074 (Jan. 4, 2007).
Notice of Allowance and Fee(s) Due for U.S. Appl. No. 11/153,095 (Aug. 24, 2006).
Notification of Transmittal of the International Search Report and the Written Opinion of the International Searching Authority, or the Declaration of International Application No. PCT/US05/21074 (May 16, 2006).
Official Action for U.S. Appl. No. 11/153,095 (Apr. 7, 2006).
Supplemental Notice of Allowability for U.S. Appl. No. 09/908,753 (Mar. 22, 2006).
Notice of Allowance and Fee(s) Due for U.S. Appl. No. 09/908,753 (Dec. 21, 2005).
Non-Final Office Action for U.S. Appl. No. 09/908,753 (Jun. 28, 2005).
"Spam Filtering and SMS," Tequila Solutions (Downloaded from the Internet on Jan. 13, 2005).
"SMS Firewall," TextPass™ Datasheet (Downloaded from the Internet on (Oct. 11, 2004).
Notice of Allowance and Fee(s) Due for U.S. Appl. No. 09/915,968 (Jun. 14, 2004).
Marek, "Putting The Squeeze on Mobile Spam," Wireless Week (Copyright 2004) (Jun. 1, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Official Action for U.S. Appl. No. 09/915,968 (Sep. 26, 2003).
"BMD Wireless Announces Innovative Solution to Detect, Filter and Block SMS SPAM," TelephonyWorld, p. 1-2 (Jul. 16, 2003).
Interview Summary for U.S. Appl. No. 09/915,968 (Jun. 23, 2003).
Moodie, "Agilent acceSS7: White Paper," Agilent Technologies, pp. 1-14 (Apr. 1, 2003).
Official Action for U.S. Appl. No. 09/915,968 (Mar. 4, 2003).
Notification of Transmittal of International Preliminary Examination Report for International Application No. PCT/US02/06185 (Feb. 21, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN SIM Authentication and Authorization," Cisco Systems, Inc., pp. 1-13 (Copyright 1992-2003).

Barry, "A Signal for Savings," Packet, Cisco Systems Users Magazine, vol. 14, No. 4, pp. Cover; 19-21; and 81 (Fourth Quarter 2002).

Notification of Transmittal of the International Search Report or the Declaration for International Application No. PCT/US02/06185 (Jul. 16, 2002).

"Agilent Technologies and Cisco Systems SS7 over IP White Paper," Cisco Systems, Inc. And Agilent Technologies, pp. 1-6 (Copyright 2002—Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

"Agilent acceSS7 Business Intelligence," Agilent Technologies, pp. 1-6 (Copyright 2001—Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

"Topsail Beach—SS7 Over IP—"Cisco Systems, Inc., pp. 1-16 (Copyright 1999).

Tekelec, "Eagle® Feature Guide," PN/9110-1225-01, (Jan. 1998).

* cited by examiner

USAGE MEASUREMENTS AND BILLING TABLE — 1200

| KEY | | BILLING RECORD DATA | | |
|---|---|---|---|---|
| Date | Time | Recv. Pty | Sending Pty | Carrier |
| 12/01/2000 | 13:01:24 | 9194691300 | 9194671100 | 0221 |
| 12/01/2000 | 13:01:26 | 9193457012 | joe@aol.com | 636 |
| 12/01/2000 | 13:01:34 | 9193457894 | 9194671230 | 221 |

METHODS, SYSTEMS, AND COMPUTER PROGRAM PRODUCTS FOR SHORT MESSAGE SERVICE (SMS) SPAM FILTERING USING E-MAIL SPAM FILTERING RESOURCES

RELATED APPLICATIONS

This application claims the benefit of U.S. Provisional Patent Application Ser. No. 60/608,591, filed Sep. 10, 2004, the disclosure of which is incorporated herein by reference in its entirety.

TECHNICAL FIELD

The subject matter described herein relates to short message service (SMS) communications and more particularly to the filtering of SMS messages using e-mail filtering resources.

BACKGROUND ART

The term "spam" is used to generally refer to unsolicited commercial e-mail (UCE), unsolicited bulk e-mail (UBE), gray mail and junk mail. The term is both a noun (the e-mail message) and a verb (to send it). Typically used to advertise products or to broadcast political or social commentary, spam has resulted in hundreds of millions of unwanted messages being transmitted daily via the Internet to almost every e-mail recipient. The continued proliferation of spam is due mostly to the fact that, despite the annoyance experienced by the vast majority of spam recipients, as an advertising medium, spam produces results. Even if only an infinitesimal number of users reply, spam is still cost effective since e-mail is an inexpensive way to reach people.

In order to address this issue, Internet service providers (ISPs) have added e-mail servers that perform spam filtering. The e-mail servers typically include a software application that filters out incoming spam e-mails. Spam filtering can be configured to filter out messages based on a variety of criteria, including sender's e-mail address, specific words in the subject or message body or by the type of attachment that accompanies the message. Address lists of habitual spammers (blacklists) are maintained by various organizations, ISPs and individuals as well as lists of acceptable addresses (whitelists) that might be misconstrued as spam. Spam filters reject blacklisted messages and accept whitelisted ones. More sophisticated spam filters look for keywords in the e-mail message and attempt to decipher their meaning in sentences in order to more effectively analyze the content and not discard a legitimate e-mail message. In addition, spam filters may also divert mail that comes to you as "Undisclosed Recipients," instead of having your e-mail address spelled out in the "To" or "CC" field.

Short message service (SMS) is a service available on most mobile phones that permits the sending of short messages (also known as text messages) between mobile phones, other handheld devices, computers, and even standard landline phones. SMS was originally designed as part of the Global System for Mobile Communications (GSM) digital mobile phone standard, but is now available on a wide range of networks, including Third Generation (3G) networks. The SMS service is typically offered as a premium service, where messages are billed on a per-message or per-kilobyte basis.

Some available SMS services offer automated messages sent on a regular basis giving news, weather, financial information, sporting event scores, and other information. In addition, some systems provide for longer SMS messages by breaking up the long message into shorter messages and adding some code indicating that the messages should be strung together at the recipient's device.

Recently, there has been an increasing trend towards the sending of spam to mobile phone users in the form of SMS messages. Since users of SMS services typically pay a premium for received SMS messages, the receipt of spam messages is of great concern to mobile phone users. Some network providers have addressed this issue by enhancing SMS services to provide spam filtering of SMS messages directly. This approach will require significant upgrades to existing SMS service infrastructure, which will be expensive and, due to the time associated with the rollout of such upgrades, is not a short-term solution. It would be advantageous to address SMS spam without requiring major upgrades to the current infrastructure.

A need therefore exists for improved methods, systems, and computer program products for screening SMS messages for spam.

SUMMARY

In one aspect of the subject matter disclosed herein, a method is disclosed for screening SMS messages. The method includes receiving an SMS message that includes a short message payload, creating an e-mail message that includes at least a portion of the SMS message, and transmitting the e-mail message to an e-mail-based spam filter.

In another aspect of the subject matter disclosed herein, a method is disclosed for screening SMS messages. The method includes receiving an SMS message that includes a short message payload, storing the SMS message in a message buffer, creating an e-mail message that includes at least a portion of the SMS message, transmitting the e-mail message to an e-mail-based spam filter, and determining whether the e-mail message has been discarded. In response to determining that the e-mail message has been discarded, the SMS message that was previously stored in the message buffer is discarded.

In another aspect of the subject matter disclosed herein, a network element for preventing the delivery of unwanted SMS signaling messages to a receiving party includes at least one communications module for sending and receiving SMS messages and for sending and receiving e-mail messages and an SMS message screening function. The SMS message screening function receives an SMS message from the communication module, creates an e-mail message that includes at least a portion of the SMS message, forwards the e-mail message to an e-mail message filtering application via the communications module, receives an e-mail message from the e-mail message filtering application via the communication module, reconstructs an SMS message from information contained in the e-mail message, and forwards the SMS message to a message recipient via the communication module.

In another aspect of the subject matter disclosed herein, a network element for preventing the delivery of unwanted SMS signaling messages to a receiving party includes at least one communications module for sending and receiving SMS messages and for sending and receiving e-mail messages and an SMS message screening function. The SMS screening function receives an SMS message from the communications module, stores the SMS message in a message buffer, creates an e-mail message that includes at least a portion of the SMS message, forwards the e-mail message to an e-mail message filtering application via the communications module, receives an e-mail message from the e-mail message filtering application via the communications module, locates and extracts the SMS message from the message buffer using information contained in the e-mail message and forwards the SMS message to a message recipient via the communications module.

In another aspect of the subject matter disclosed herein, a telecommunications network element includes a communications module for receiving a message service message including message service content and an SMS screening function operatively associated with the communications module for generating an e-mail message including the message service content and forwarding the e-mail message to an e-mail-based spam filter.

The subject matter described herein can be implemented using a computer program product comprising computer-executable instructions embodied in a computer-readable medium. Exemplary computer-readable media suitable for implementing the subject mailer described herein include disk memory devices, chip memory devices application specific integrated circuits, and programmable logic devices. In addition, a computer program product that implements the subject matter described herein can be implemented using a single physical device or computing platform. Alternatively, a computer program product that implements the subject matter described herein can be distributed across multiple devices or computing platforms.

BRIEF DESCRIPTION OF THE DRAWINGS

Preferred embodiments of the subject matter disclosed herein will now be explained with reference to the accompanying drawings of which:

FIG. 12 illustrates an exemplary usage measurement and billing information table for tracking usage measurement- and billing-related information each time e-mail spam screening resources are used to screen an SMS message.

DETAILED DESCRIPTION

Figure 1:
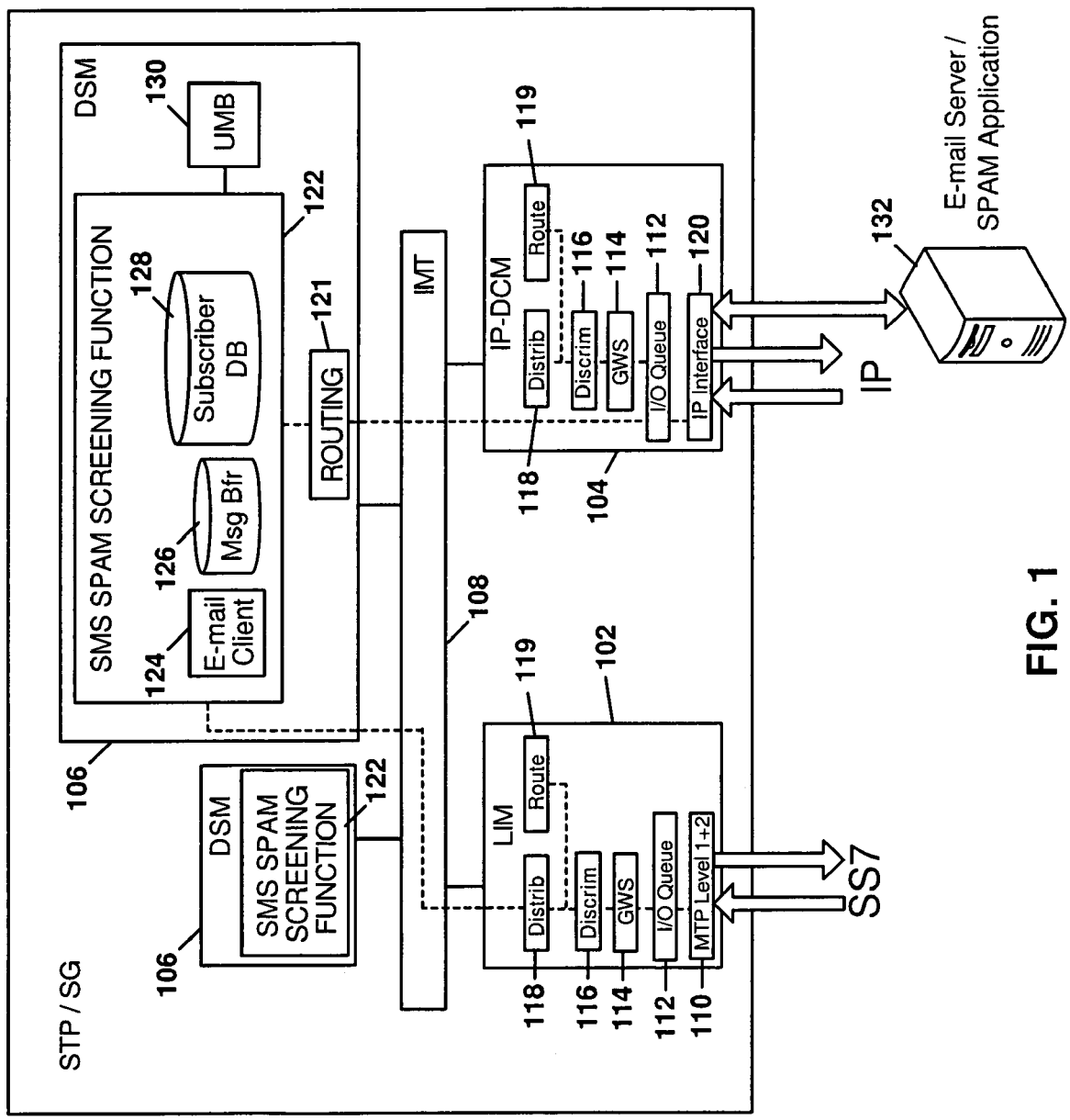
FIG. 1 is a block diagram of an internal architecture associated with an STP/SG having distributed processing according to an aspect of the subject matter disclosed herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, or store the program for use by or in connection with the instruction execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

The subject matter described herein includes methods, systems, and computer program products for preventing the delivery of unwanted SMS messages, such as those containing unsolicited commercial messages or spam, in a communications network. More particularly, SMS messages are intercepted prior to delivery and at least a portion of the SMS message content is encapsulated within an e-mail message. The e-mail message is communicated to an e-mail spam filtering resource in a data network, where spam screening/filtering algorithms are applied. In one embodiment, the e-mail message is discarded at the e-mail spam filtering resource if the message fails spam screening. If the message passes spam screening, the original SMS message that is associated with the e-mail message is delivered to the intended message recipient.

Several embodiments are disclosed herein and generally illustrated in the accompanying figures. As described herein, an SMS spam screening function may be located in a signaling message routing node, such as a signal transfer point (STP) or Internet protocol (IP)-capable signaling gateway (SG). However, it will be appreciated that an SMS spam screening function according to the subject matter described herein could be co-located with virtually any network element (e.g., short message service center, mobile switching center, service control point, data network router, etc.) or could alternatively be implemented as a stand-alone element in a network.

FIG. 1 is a block diagram of an internal architecture associated with an STP/SG 100 having distributed processing in accordance with the subject matter described herein. STP/SG 100 includes an SS7-capable link interface module (LIM) 102 adapted to receive and transmit SS7 messages, an IP-capable data communication module (DCM) 104 adapted to receive and transmit messages over an IP-based connection, and a database services module (DSM) 106 adapted to perform an SMS spam screening function. An interprocessor message transport (IMT) bus 108 provides a pair of high speed counter rotating serial buses or a high speed Ethernet local area network (LAN) to support communication between the LIM 102, DCM 104, and DSM 106.

LIM 102 is adapted to receive and transmit a variety of SS7-based messages, including TCAP/MAP SMS messages. LIM 102 includes an SS7 interface function 110 that supports message transfer protocol (MTP) level 1 and 2 functionality. SS7 interface function 110 receives messages from external SS7 network nodes and forwards the messages to an I/O queue 112. A gateway screening function 114 receives messages from I/O queue 112 and determines whether the queued message should be permitted into STP/SG 100 or discarded. Messages passing screening by gateway screening function 114 are forwarded to a discrimination function 116. Discrimination function 116 determines whether the message requires further processing by STP/SG 100 or whether the message is to be through-switched to another node in the network. Messages requiring further processing are forwarded to a distribution function 118 for internal distribution to the processing module that performs the internal processing. LIM 102 may also include a routing function 119 that routes messages that are identified by discrimination function 116 as through-switched messages.

DCM 104 provides functions similar to LIM 102, except that messages are received from and transmitted to nodes in an IP-based network through an IP interface function 120. IP interface function 120 may receive and transmit using a variety of IP-based protocols, such as TCP/IP, UDP/IP, or SCTP/IP. Examples of messages received and transmitted via DCM 104 may include SS7-over-IP protocol messages (e.g., IETF SIGTRAN messages, Transport Adapter Layer Interface (TALI) messages, etc.), session initiation protocol (SIP) messages, Simple Mail Transfer Protocol (SMTP) messages, short message point-to-point (SMPP) messages, post office protocol (POP) messages, and other types of electronic mail and signaling messages. In order to process incoming SS7 messages received over IP signaling links, DCM 104 may include functions 112, 114, 116, 118, and 119, the operation of which is the same as the corresponding functions of LIM 102.

DSM 106 receives SMS messages from a communications module (e.g., SS7 LIM 102, IP DCM 104, etc.) and performs SMS spam screening processing on the messages. In one embodiment, discrimination function 116 on LIM 102 is adapted to receive an SS7 message and examine the message to determine whether the message contains an SCCP payload. If the received message contains an SCCP payload, the message is distributed (via distribution function 118 on the LIM 102) to a DSM 106. SMS spam screening function 122 may determine whether a message includes SMS content and whether spam screening is provisioned for the intended recipient. In response to determining that the message includes SMS content and that spam screening is provisioned for the intended recipient, SMS spam screening function 122 may forward the message to an e-mail spam filter for spam filtering. In response to determining that the message does not include SMS content, SMS spam screening function 122 may forward the message to another application, such as a GTT application, resident on DSM 106 that processes SCCP messages. DSM 106 may also include a routing function 121 for routing SS7 and/or IP messages leaving DSM 106. For example, routing function 121 may route post-screened SMS messages to SS7 destinations and e-mail encapsulated SMS messages to e-mail spam screening destinations.

SMS spam screening function 122 includes an e-mail client 124 for sending, receiving and processing SMS-related e-mail messages, an SMS message buffer 126 that stores SMS messages in a memory, such as a RAM, a subscriber database 128 that identifies SMS subscribers that have authorized spam screening of their inbound SMS messages, and a usage measurement and billing (UMB) database 130 for maintaining usage statistics and billing information related to the screening of SMS messages on behalf of an SMS recipient.

Figure 2:
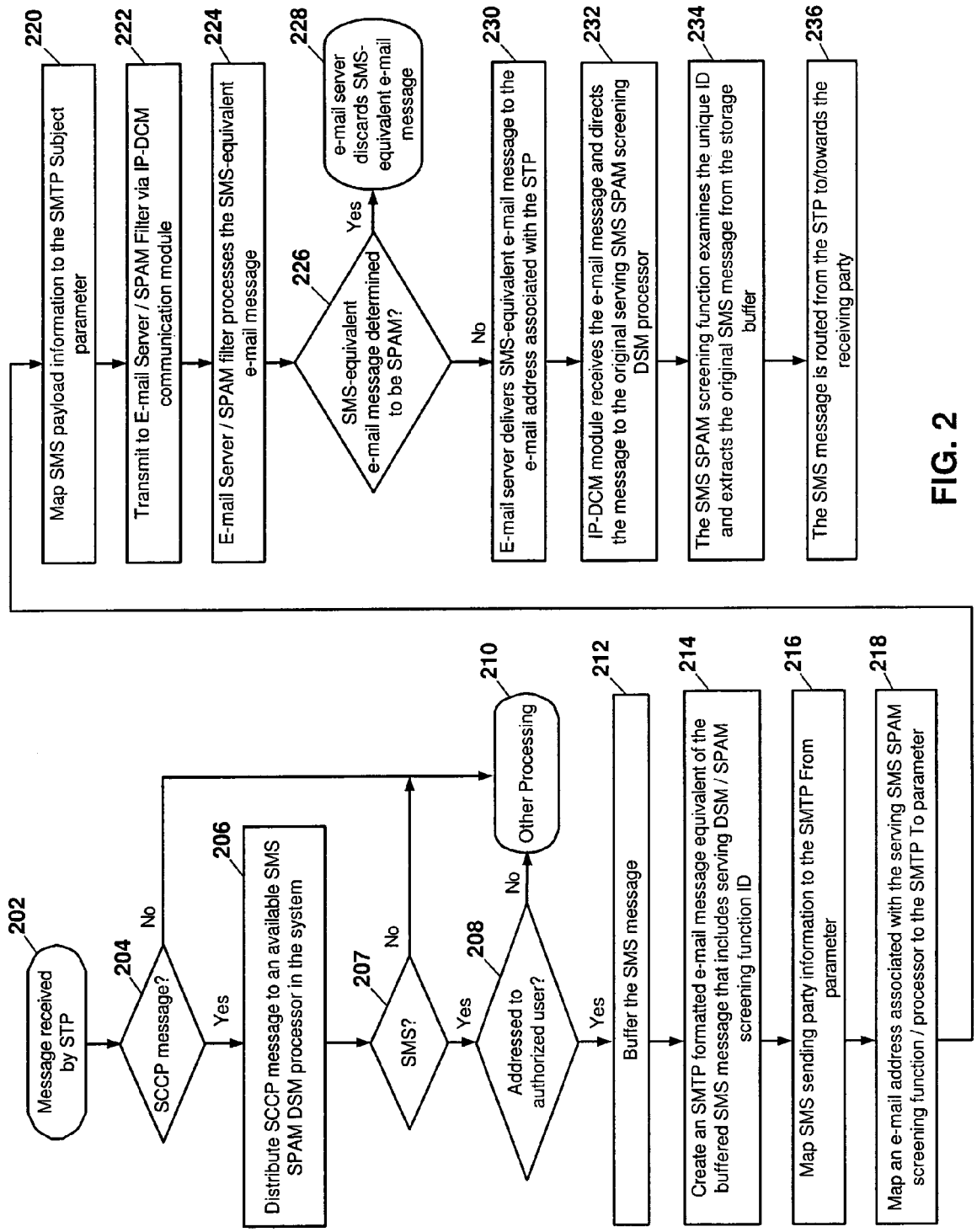
FIG. 2 is a flow diagram of an SMS spam screening process according to an aspect of the subject matter disclosed herein.

FIG. 2 is a flow diagram of an SMS spam screening process according to an aspect of the subject matter disclosed herein. Referring to FIG. 2, in step 202, a message is received by STP/SG 100, for example via LIM 102. In step 204, discrimination function 116 determines whether the message is an SCCP message. If the message is an SCCP message, discrimination function 116 forwards the message to distribution function 118 for internal distribution. Distribution function 118 forwards the SCCP message to an available DSM 106 adapted to provide SMS spam screening (step 206). In step 207, it is determined whether the SCCP message is an SMS message. If the message is an SMS message, control proceeds to step 208 where SMS spam screening function 122 of DSM 106 determines whether the SMS message is addressed to an authorized subscriber (i.e., a subscriber for whom SMS spam filtering is provisioned), for example by comparing the address in the message "To" field with entries in subscriber database 128. If the message was determined not to be an SCCP message (step 204) or not an SMS message (step 207), control may proceed to step 210 where other processing, such as GTT processing, is performed, and spam SMS screening is bypassed. Similarly, in step 208, if spam SMS screening is not provisioned for the subscriber, control may proceed to step 210 where spam SMS screening is bypassed.

In step 212, SMS messages addressed to an authorized subscriber are stored in message buffer 126, and an e-mail message that includes predetermined content from the buffered SMS message is created (step 214). The e-mail message may be in any suitable e-mail format, such as SMTP or POP3 format. In this example, it is assumed that the message is an SMTP message. The e-mail message may include the identity of the serving DSM 106. The e-mail message is completed by mapping SMS sending party information to the SMTP "From" parameter (step 216), mapping an e-mail address associated with the serving SMS spam screening function 122 to the SMTP "To" parameter (step 218), and mapping SMS payload information to the SMTP "Subject" parameter (step 220). The e-mail message may be formed using e-mail client 124 and transmitted to an e-mail server 132 capable of spam filtering via DCM 104 (step 222).

In step 224, e-mail server 132 receives the SMS-equivalent e-mail message and processes the message to determine whether it includes spam content. If the e-mail message is determined to include spam content (step 226), e-mail server 132 may discard the message (step 228). Otherwise, e-mail server 132 delivers, in step 230, the SMS-equivalent e-mail message to the e-mail address associated with STP/SG 100. In step 232, DCM 104 of STP/SG 100 receives and processes the e-mail message, as discussed above with respect to FIG. 1. For example, discrimination process 116 may determine that the e-mail message requires further processing and distribution process 118 may route the e-mail message to the DSM 106 identified in the e-mail message. In step 234, SMS spam screening function 122 examines the unique message ID and extracts the original SMS message from storage buffer 126. The SMS message is then routed to the receiving party (step 236).

Figure 3:
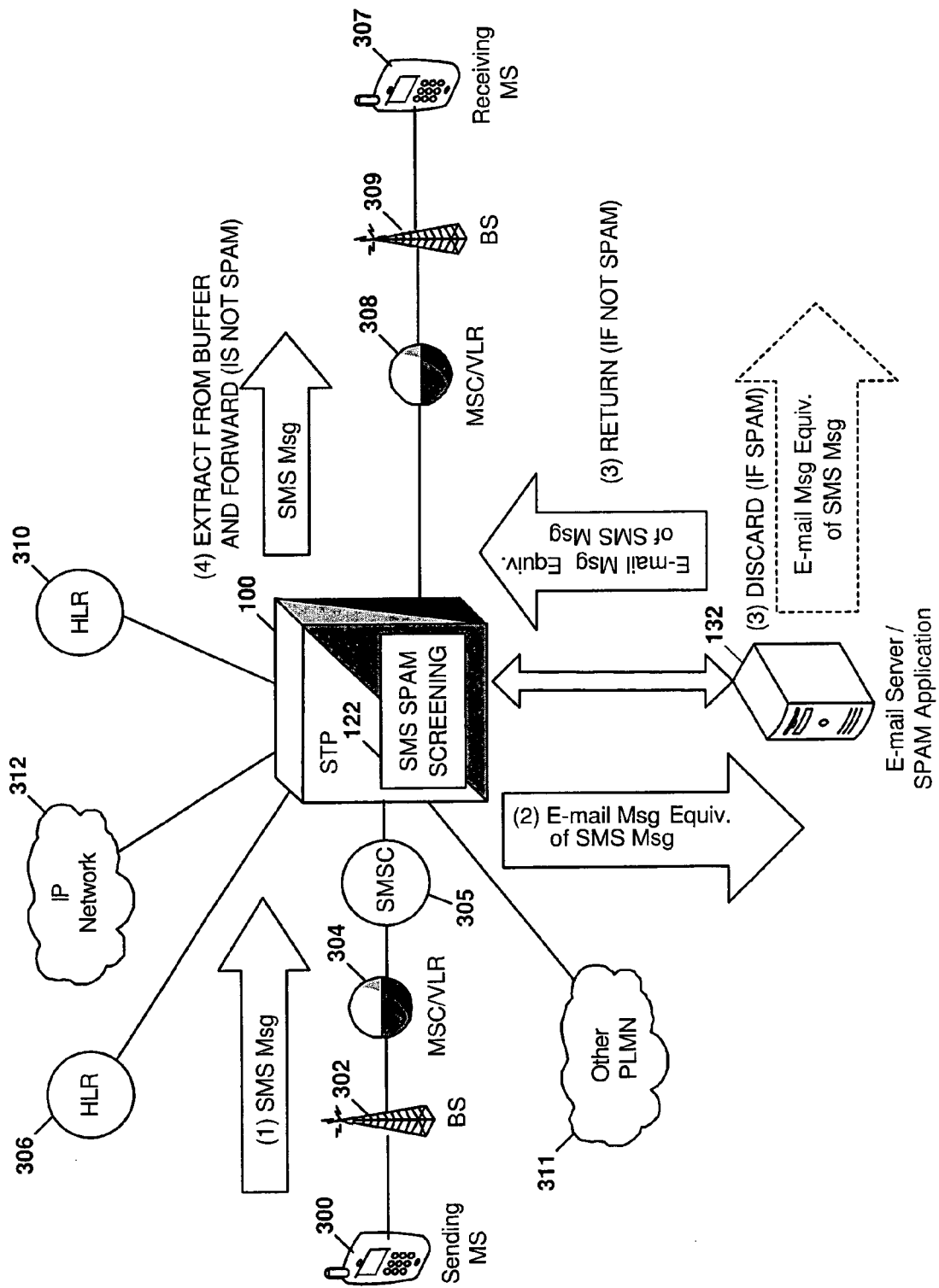
FIG. 3 is a block diagram illustrating an exemplary signaling scenario according to an aspect of the subject matter disclosed herein.

FIG. 3 is a block diagram illustrating an exemplary signaling scenario according to an aspect of the subject matter disclosed herein. In FIG. 3, an SMS message is sent by a sending mobile station 300 via a wireless communication network, such as a global system for mobile communication (GSM) network or an American National Standards Institute (ANSI) Interim Standard (IS)-41 network, using the signaling system 7 (SS7) and mobile application part (MAP) signaling protocols. The wireless communication network may include a base station (BS) 302, a mobile switching center/visitor location register (MSCNLR) 304, and a short message service center (SMSC) 305. A home location register (HLR) 306 may store mobile subscription information for sending mobile station 300. The network of a receiving mobile station 307 may include an MSCNLR 308, a base station 309, and an HLR 310. It will be appreciated that SMS messages may also be originated from other public land mobile networks (PLMNs) 311 or from Internet-based sources 312.

In the signaling example illustrated in FIG. 3, when sending mobile station 300 originates an SMS message, the SMS message is forwarded to the sending mobile station's short message service center 305 via base station 302 and MSCNLR 304. SMSC 305 may query HLR 310 to obtain the location of the MSCNLR where receiving mobile station 307 is currently registered. In a GSM implementation, SMSC 305 may send a Send_Routing_Info_for_SM message to STP 100. STP 100 may perform global title translation based on the MSISDN number in the message and forward the message to HLR 310. HLR 310 may respond with the location of MSCNLR 308 currently serving receiving mobile station 307.

Once SMSC 305 obtains the address of MSC/VLR 308, SMSC 305 may send the SMS message to STP 100. Rather than routing the message, STP 100 may generate an e-mail message that includes predetermined content extracted from the SMS message and forward the e-mail message to e-mail server 132. E-mail server 132 performs spam screening for the e-mail message. If the message passes the screening, e-mail server 132 may return the e-mail message to STP 100. STP 100 may then send the corresponding SMS message to receiving mobile station 307 via MSC/VLR 308 and base station 309. If the message is determined to be spam, the e-mail message may be discarded. In this situation, STP 300 may discard the original SMS message.

Returning to FIG. 1, an SMS message may be received at STP/SG 100 via receiving SS7 LIM module 102. Discrimination function 116 on the receiving LIM 102 examines the received message, identifies the message as an SCCP message, and distributes the SCCP message to an available SMS spam screening DSM processor module 106 residing in the STP/SG 100. The SCCP message is next examined by SMS spam screening function 122 to determine whether the message is an SMS message and whether the message destined to a recipient (e.g., mobile subscriber) served by a carrier/network operator administering the spam screening service. Determining whether the message is an SMS message may be performed by examining the TCAP opcode in the message. If the opcode indicates a MAP message type that carries SMS content the message may be identified as an SMS message. Determining whether the message is destined for a recipient served by a carrier implementing spam SMS screening may include comparing message recipient information contained in the SMS message to authorized subscriber information contained in subscriber database 128.

If the message is destined to a recipient (e.g., a mobile subscriber) that has not authorized spam screening service or is not serviced by a carrier/network operator administering the spam screening service, then no spam screening processing is applied to the received SMS message. Otherwise, the SMS message is temporarily stored in SMS message buffer 126, and an e-mail equivalent of the SMS message is created using simple mail transfer protocol (SMTP), post office protocol 3 (POP3), or other suitable e-mail protocol.

In one embodiment, SMS sending party information (e.g., sending party mobile subscriber integrated services digital network (MSISDN) identifier) is stored in the Envelope "From" field of the e-mail message. The SMS sending party information may also be stored in the Header "From" field of the e-mail message. In the interest of security, it will be appreciated that the SMS sending party information stored in the "From" fields may be encoded or encrypted in order to mask the true identity of the SMS sending party.

Information that identifies the serving DSM module 106, such as the DSM ID or an ID for the serving SMS spam screening function, may also be stored in the Envelope "From" field. Furthermore, the storage location of the SMS message in message buffer 126, such as a memory address or offset value, may also be stored in the Envelope "From" field. It will be appreciated that the DSM module identification and memory storage location identification information may alternatively be stored in other fields of an SMTP message. This identification information may be used to uniquely identify both the serving DSM processor module 106 as well as the SMS message.

In one embodiment, an e-mail address associated with STP/SG 100 is stored in the Envelope "To" field. In an alternate embodiment, an e-mail address associated with the serving SMS spam screening function 122 is stored in the Envelope "To" field. The SMS text payload may be stored in a "Subject" field in the Header portion of the SMTP message. In an alternate embodiment, the SMS text payload may be stored in the Body portion of the SMTP message.

Figure 4A:
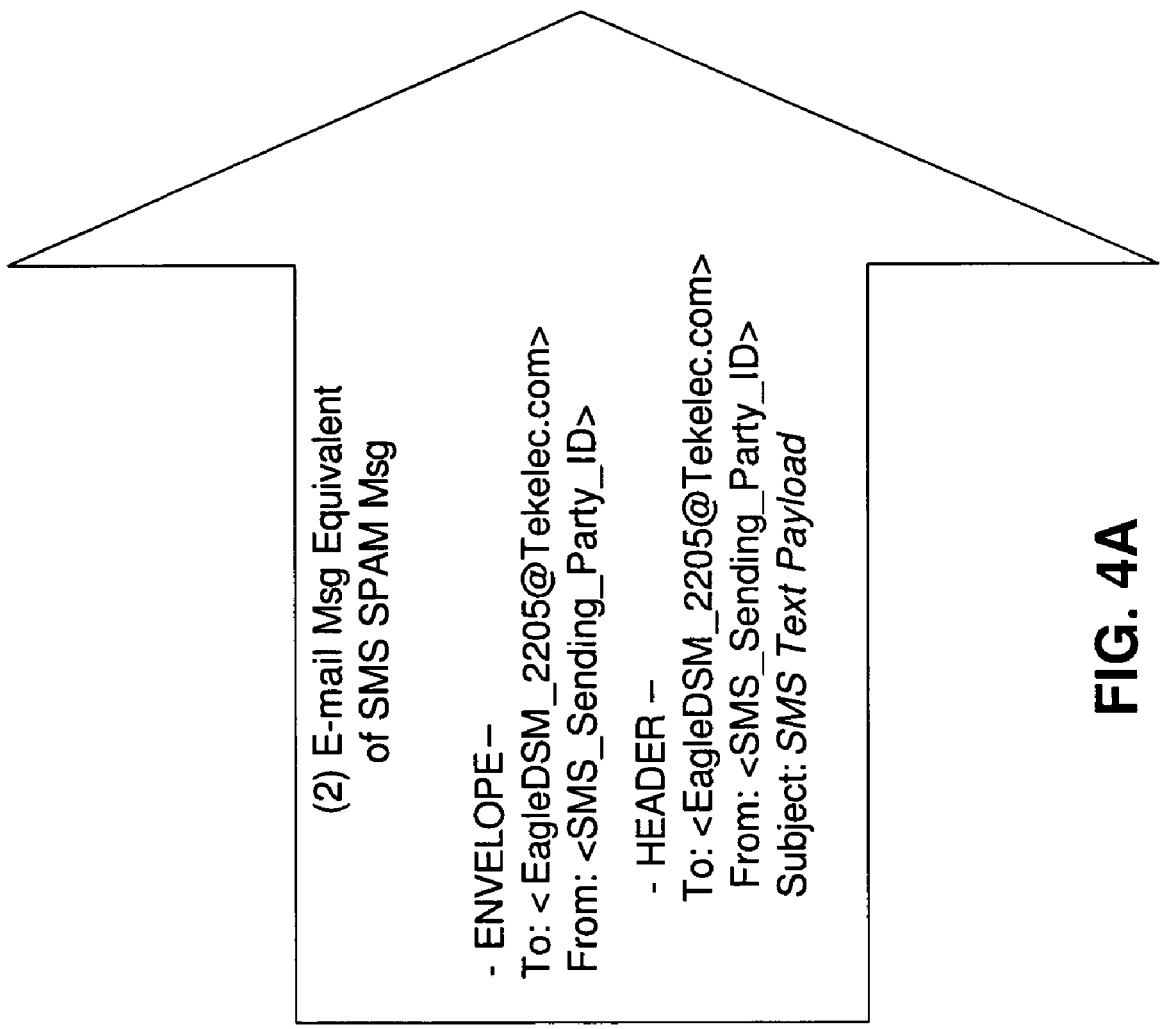
FIGS. 4A and 4B are diagrams illustrating exemplary SMS-SMTP mappings according to an aspect of the subject matter disclosed herein.
Figure 4B:
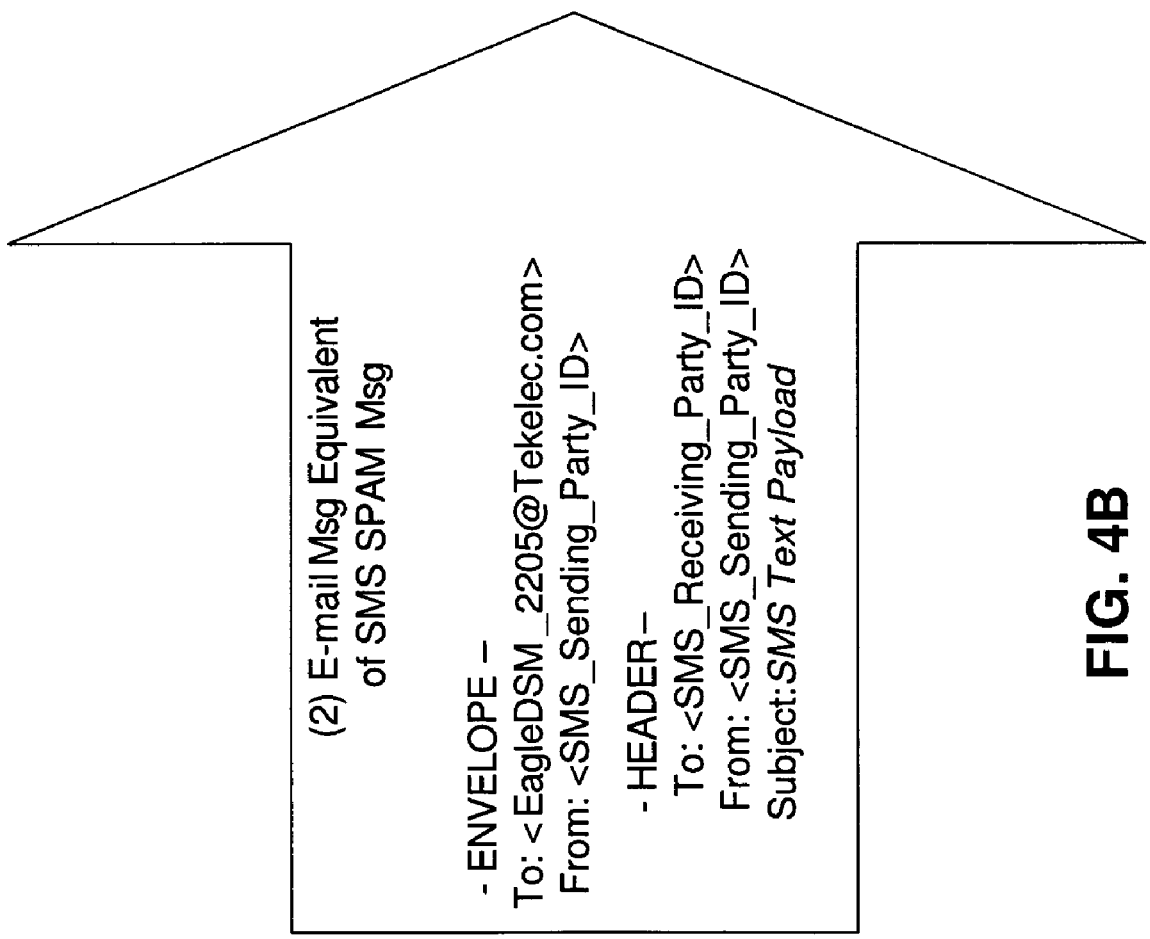

FIGS. 4A and 4B are diagrams illustrating exemplary SMS-to-SMTP mappings. In FIG. 4A, the "To" field of the Header portion of the SMTP message contains the e-mail address associated with STP/SG 100. In FIG. 4B, the "To" field of the Header portion of the SMTP message contains the e-mail address of an intended recipient 307 of the SMS message. As such, the e-mail address of intended message recipient 307 may be used to confirm that spam filtering is requested by the user and any user-specific spam filters that may be implemented.

Once the SMS-related SMTP e-mail message is created, the message is directed to IP-capable DCM communication module 104, which transmits the message to e-mail server 132 in an associated data network. E-mail server 132 is adapted to receive the SMS-related e-mail message and to subsequently process the e-mail message using e-mail spam filtering resources/algorithms, such as a spam filtering application.

In one embodiment, if the SMS-related e-mail message is determined to contain spam, then e-mail server 132 is adapted to discard the message. In this case, the spam screening function 122 on the serving DSM 106 would flush the associated SMS message from message buffer 126 after a predetermined time-out period, during which no response was received from e-mail server 132. If, however, the SMS-related e-mail message is determined not to contain spam, then e-mail server 132 delivers the SMS-equivalent e-mail message to the STP/SG 100, which receives and processes the e-mail message, as discussed above. SMS spam screening function 122 examines the unique message ID and extracts the original SMS message from storage buffer 126. The SMS message is then routed to the receiving party.

Figure 5:
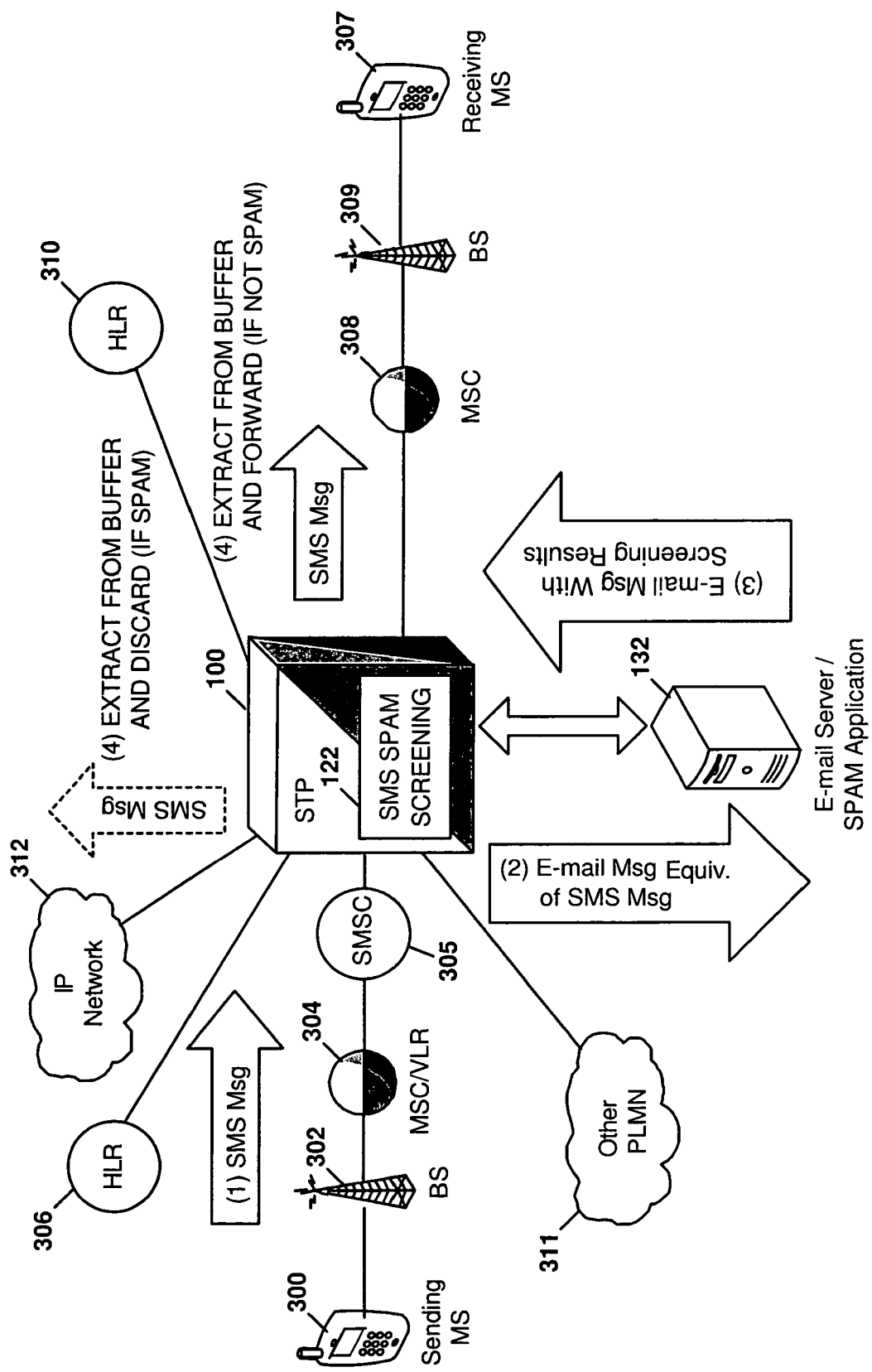
FIG. 5 is a block diagram illustrating another signaling scenario according to an aspect of the subject matter disclosed herein.
Figure 6:
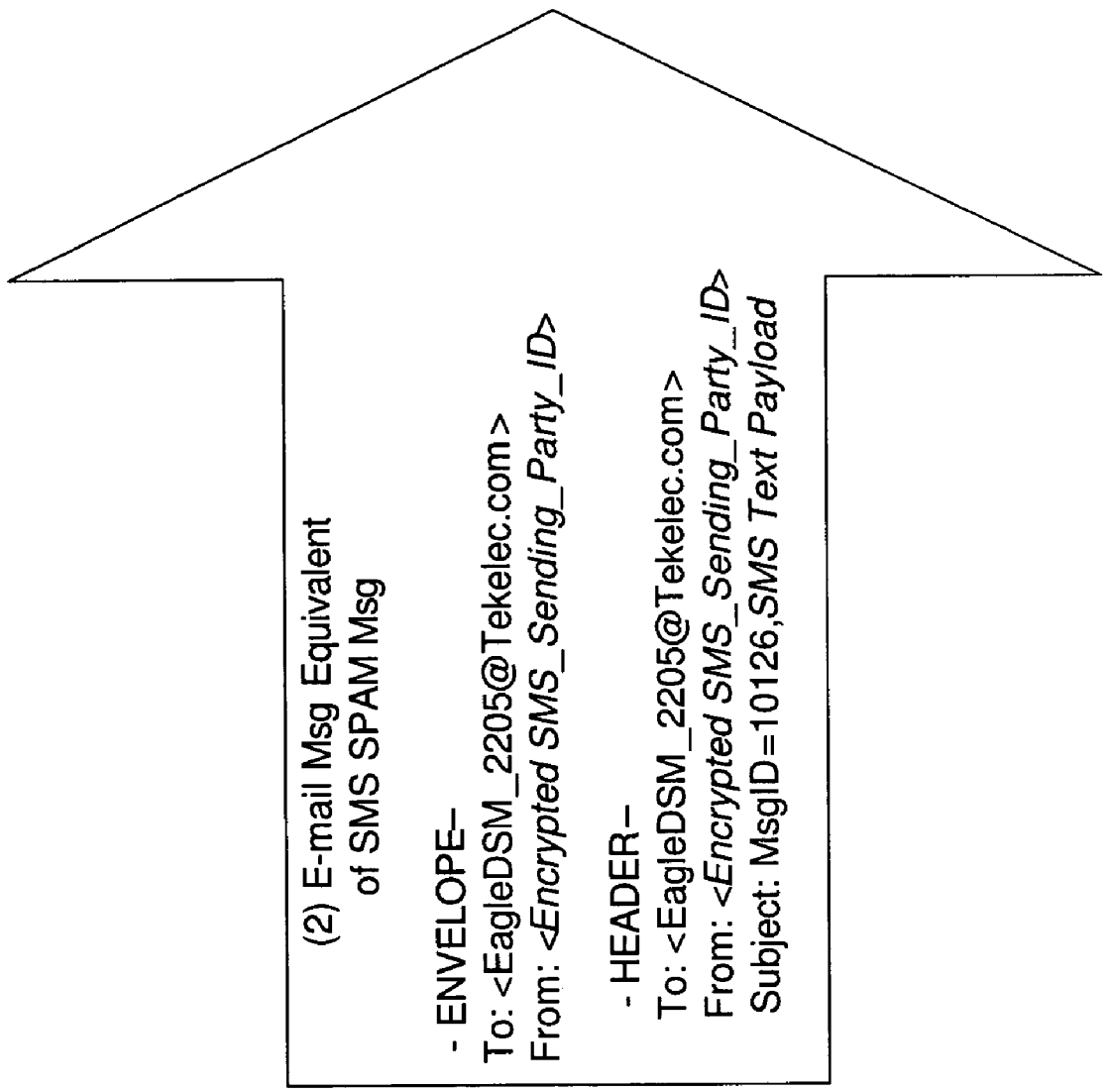
FIG. 6 is a diagram illustrating an exemplary SMS-SMTP mapping according to an aspect of the subject matter disclosed herein.
Figure 7:
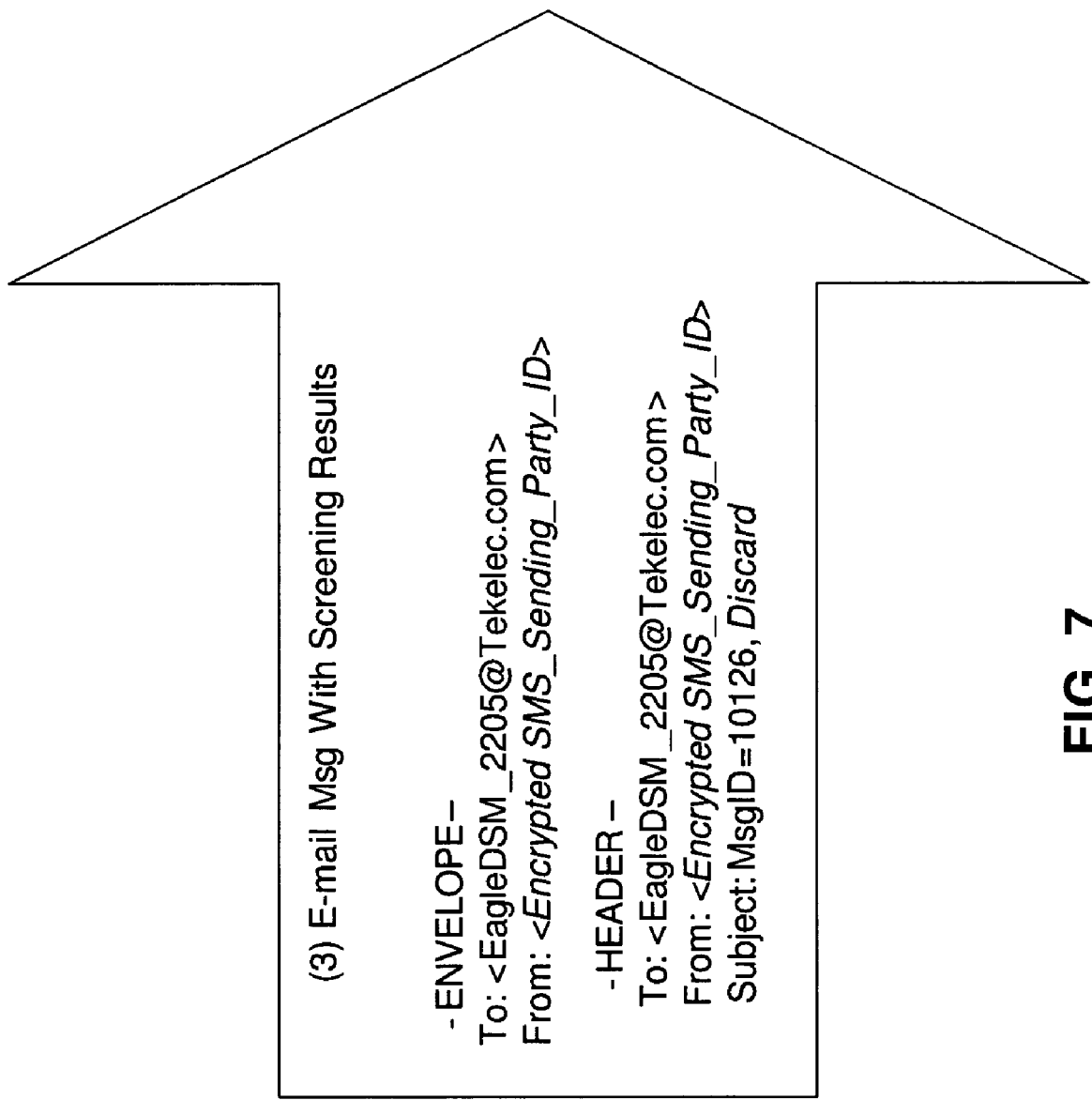
FIG. 7 is a diagram illustrating an e-mail message with screening results according to an aspect of the subject matter disclosed herein.

FIG. 5 is a block diagram illustrating another signaling scenario according to an aspect of the subject matter disclosed herein. In FIG. 5, an SMS-related e-mail message illustrated by FIG. 6 is forwarded to e-mail server 132 as described above. If the SMS-related e-mail message is determined to contain spam, then e-mail server 132 is adapted to append spam screening result or disposition information to the SMS-related e-mail message and deliver an e-mail message illustrated by FIG. 7 to the message addressee (i.e., STP/SG 100 or serving DSM module 106). The spam screening result or disposition information is then used by SMS spam screening function 122 on the serving DSM 106 of STP/SG 100 to processes the original SMS message. For example, based on the spam screening result returned from e-mail server 132, serving SMS spam screening function 122 may discard the buffered SMS message or route SMS message to the intended SMS message recipient 307.

Figure 8:
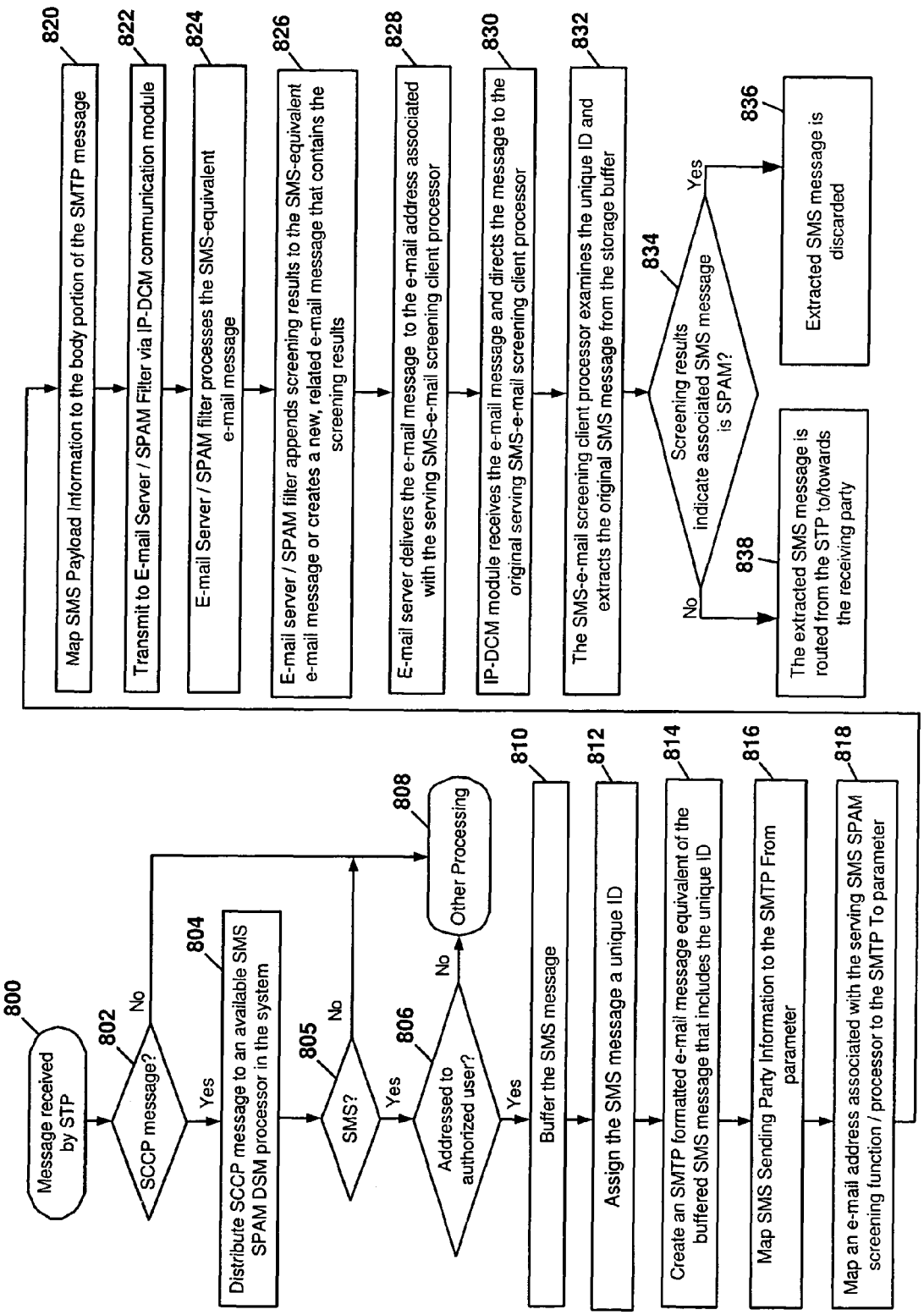
FIG. 8 is a flow diagram illustrating the SMS spam screening process of FIG. 5 according to an aspect of the subject matter disclosed herein.

FIG. 8 is a flow diagram illustrating the SMS spam screening process of FIG. 5 according to an aspect of the subject matter disclosed herein. In FIG. 8, a message is received by STP/SG 100, for example via LIM 102, in step 800. In step 802, discrimination function 116 determines whether the message is an SCCP message. If the message is an SCCP message, discrimination function 116 may forward the message to distribution function 118 for internal distribution. Distribution function 118 forwards the SCCP message to an available DSM 106 adapted to provide SMS spam screening (step 804). In step 805, SMS spam screening function 122 determines whether the message is an SMS message. If the message is determined to be an SMS message, control proceeds to step 806 where SMS spam screening function 122 determines whether the SMS message is addressed to an authorized subscriber, for example by comparing the address in the message "To" field with entries in subscriber database 128. If, in step 802, the message is determined not to be an SCCP message, in step 805 the message is determined not to be an SMS message or in step 806, the SMS message is determined not to be addressed to an authorized subscriber, the message is not subjected to SMS spam screening and may be forwarded to other processes (step 808).

In step 810, SMS messages addressed to an authorized subscriber are stored in message buffer 126. SMS messages stored in message buffer 126 are each assigned a unique ID in step 812. An e-mail message equivalent to the buffered SMS message is created in step 814. The e-mail message may be in any suitable e-mail format, such as SMTP or POP3 format. In this example, it is assumed that the e-mail message is an SMTP message. The e-mail message may include the identity of the serving DSM 106. The SMTP-formatted e-mail message may be completed by mapping SMS sending party information to the SMTP "From" parameter (step 816), mapping an e-mail address associated with the serving SMS spam screening function 122 to the SMTP "To" parameter (step 818), and mapping SMS payload information to the SMTP "Subject" parameter (step 820). The e-mail message may be formed using e-mail client 124 and transmitted to an e-mail server 132 capable of spam filtering via DCM 104 (step 822).

In step 824, e-mail server 132 receives the SMS-equivalent e-mail message and processes the message to determine whether it includes spam content. E-mail server 132 appends screening results to the SMS-equivalent e-mail message or creates a new, related e-mail message that contains the screening results (step 826). E-mail server 132 delivers, in step 828, the SMS-equivalent e-mail message to the e-mail address associated with STP/SG 100. In step 830, DCM module 104 of STP/SG 100 receives and forwards the e-mail message to the original serving SMS spam screening function 122. In step 832, SMS spam screening function 122 examines the unique message ID and extracts the original SMS message from message buffer 126. The appended spam screening information is read by serving SMS spam screening function 122 to determine whether the e-mail server determined that the associated SMS message is spam in step 834 and to processes the original SMS message accordingly. For example, if in step 834 the spam screening result/disposition information returned from e-mail server 132 indicates that the associated SMS message is spam, serving SMS spam screening function 122 discards the buffered SMS message in step 836. Alternatively, if in step 834 the spam screening result/disposition information returned from e-mail server 132 indicates that the associated SMS message is not the spam, the SMS message is routed to the intended SMS message recipient 307 in step 838.

It will be appreciated that in the scenarios where the SMS-related e-mail message or a spam screening result e-mail message is returned to STP/SG 100, DSM module ID information contained in the e-mail message may be used to efficiently distribute the e-mail message to the SMS spam screening function 122 that originally processed and buffered the associated SMS message. For example, when an SMS-related e-mail message is sent to STP/SG 100, the receiving IP-DCM module 104 is adapted to examine the DSM module ID information contained in the e-mail message and subsequently distribute the e-mail message to the identified DSM module 106 in the system.

Once the e-mail message has been distributed to the SMS spam screening function 122 that originally processed the SMS message, the message buffer memory storage location information contained in the e-mail message may be used to efficiently locate and extract the associated SMS message from message buffer 126.

The subject matter described herein is not limited to buffering the original SMS message and forwarding the buffered message to the destination in response to determination that the message is not spam. In an alternate implementation, the sending DSM may receive the e-mail message that indicates that the screened SMS message is not spam and reconstruct the SMS message based on the parameters encapsulated in the received email message. Such an implementation eliminates the need for the sending DSM to buffer SMS messages or correlate received e-mail messages with buffered the SMS messages.

Figure 9:
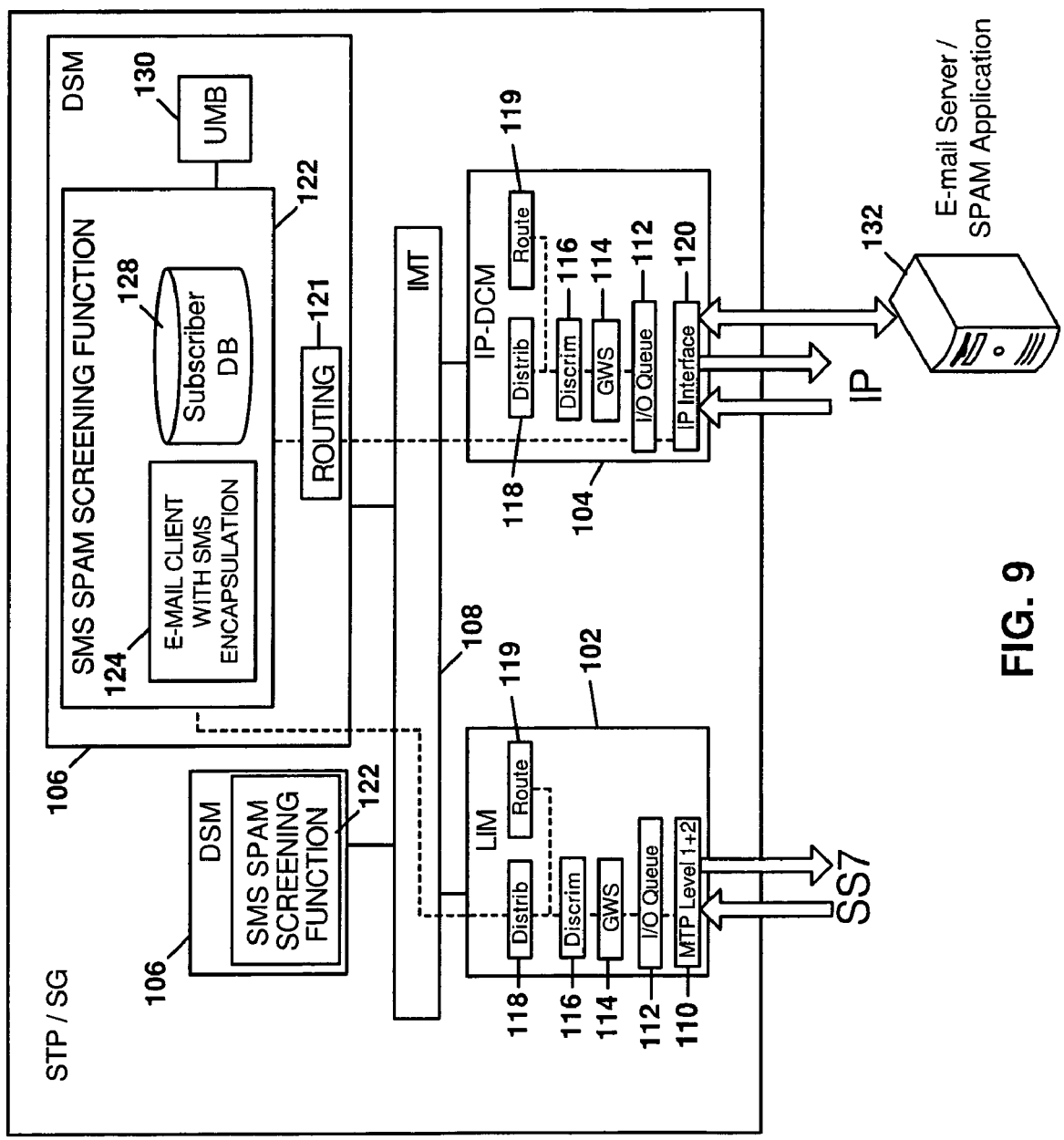
FIG. 9 is a block diagram of an internal architecture associated with an STP/SG having distributed processing according to an aspect of the subject matter disclosed herein.

FIG. 9 is a block diagram of an internal architecture associated with an STP/SG having distributed processing according to yet another aspect of the subject matter disclosed herein. In FIG. 9, STP/SG 100 is configured and functions similar to STP/SG 100. In this case, however, SMS spam screening function 122 does not require a message buffer. In addition, e-mail client 124 is configured to encapsulate SMS messages in SMTP e-mail messages. For example, a received SMS message may be encapsulated and placed within the Body portion of an SMTP e-mail message. This encapsulation may include SS7 message transfer part (MTP) layer 3 information, as well as signaling connection control part (SCCP), transaction capabilities application part (TCAP), and/or mobile application part (MAP) layer information. In addition, any lower protocol layer information necessary to route the SMS message to its intended recipient 307 may be encapsulated in the e-mail message, which is then transmitted to e-mail server 132. E-mail client 124 is also configured to extract the encapsulated SMS messages from the SMTP e-mail message from e-mail server 132.

Figure 10:
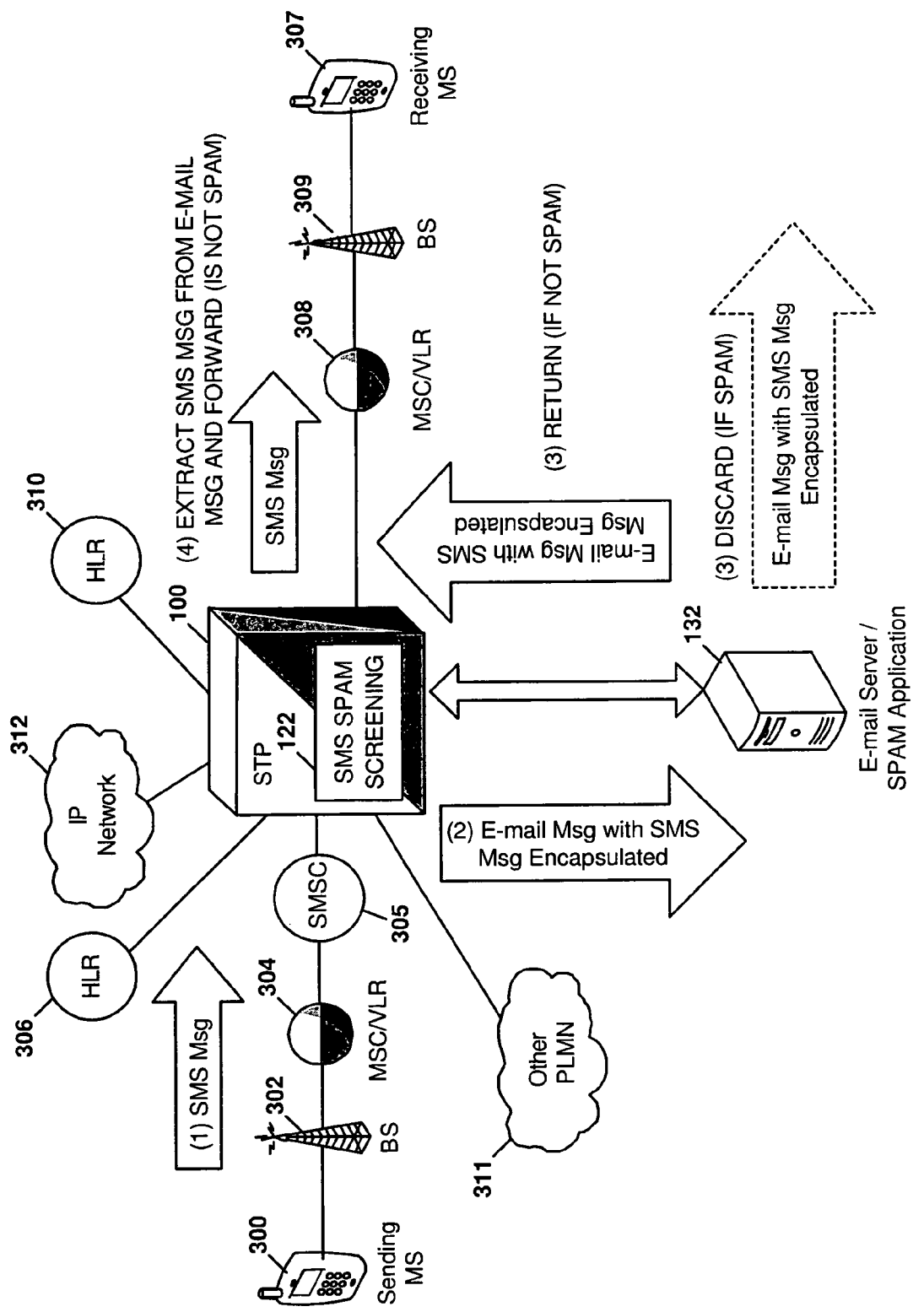
FIG. 10 is a block diagram illustrating another signaling scenario according to an aspect of the subject matter disclosed herein.

FIG. 10 is a block diagram illustrating another signaling scenario according to an aspect of the subject matter disclosed herein. In FIG. 10, STP/SG 100 described in FIG. 9 receives the SMS message, encapsulates it in a SMTP e-mail message, and forwards the e-mail-encapsulated message to e-mail server 132. E-mail server 132 processes the e-mail-encapsulated message to determine if it is spam, discards the e-mail-encapsulated message if it is spam, and returns the e-mail-encapsulated message to STP/SG 100 if it is not spam, where the encapsulated SMS message is extracted and forwarded to intended recipient 307. Alternatively, as discussed above with reference to FIGS. 5-8, e-mail server 132 may include spam screening results with the e-mail message that contains the encapsulated SMS message and forward the e-mail message to STP/SG 100 for processing in accordance with the screening results. Based on the spam screening results, the e-mail message is either discarded or the encapsulated SMS message is reconstructed and forwarded to intended recipient 307.

Figure 11:
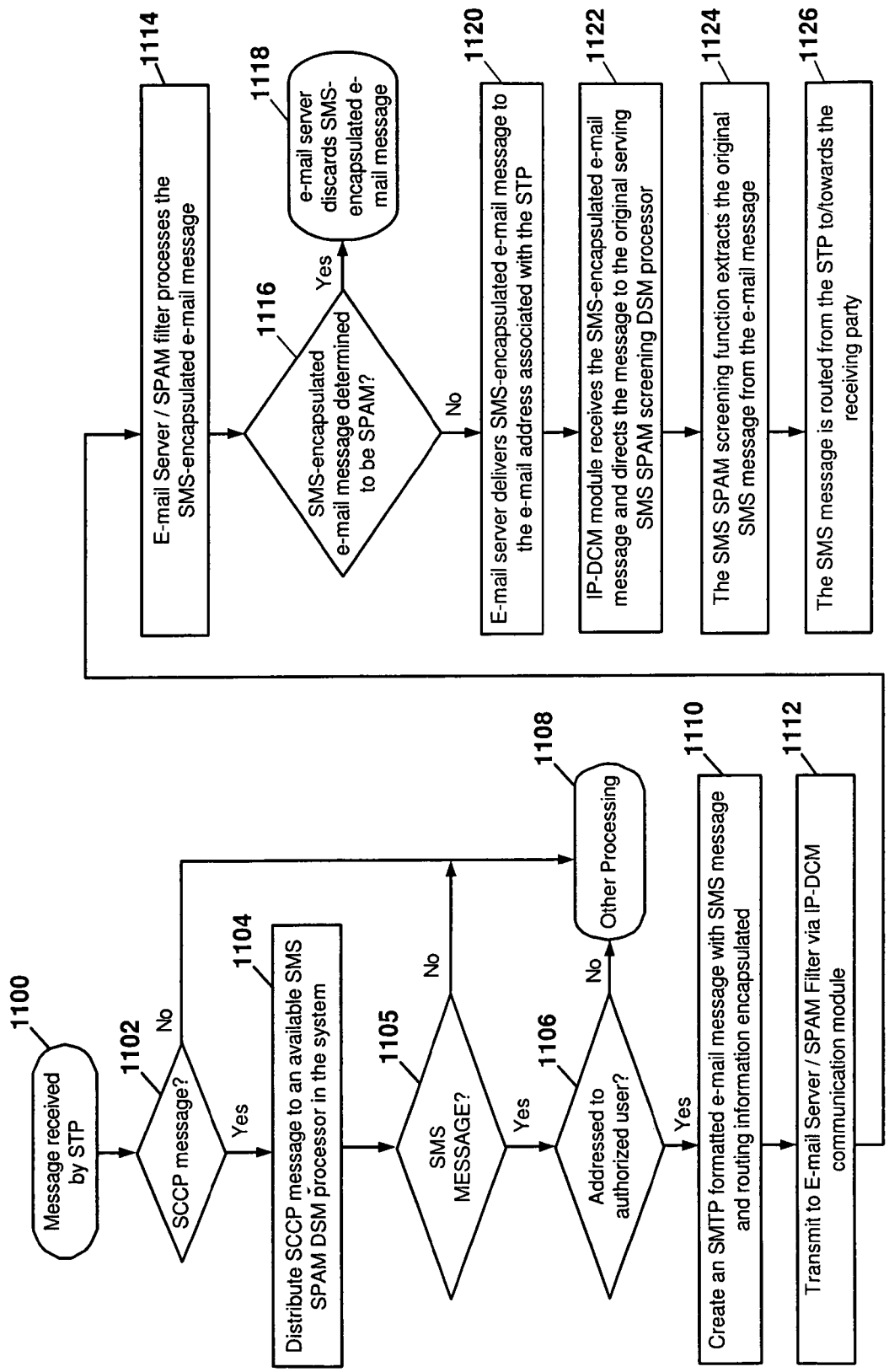
FIG. 11 is a flow diagram illustrating the SMS spam screening process of FIG. 10 according to an aspect of the subject matter disclosed herein.

FIG. 11 is a flow diagram illustrating the SMS spam screening process of FIG. 10 according to an aspect of the subject matter disclosed herein. In FIG. 11, a message is received by STP/SG 100 in step 1100. In step 1102, discrimination function 116 determines whether the message is an SCCP message. If the message is an SCCP message, discrimination function 116 forwards the message to distribution function 118 for internal distribution. If the message is an SCCP message, distribution function 118 forwards the SCCP message to an available DSM 106 adapted to provide SMS spam screening (step 1104). In step 1105, SMS spam screening function 122 determines whether the message is an SMS message. If the message is an SMS message, control proceeds to step 1106 where SMS spam screening function 122 of DSM 106 determines whether the SMS message is addressed to an authorized subscriber, for example by comparing the address in the message "To" field with entries in subscriber database 128. If in step 1102, the message was determined not to be an SCCP message, in step 1105, the message is determined not to be an SMS message or in step 1106, the SMS message was not addressed to an authorized subscriber, the message is not subjected to SMS spam screening and may be forwarded to other processes (step 1108).

In step 1110, an SMTP-formatted e-mail message is created with the SMS message and the lower layer routing information encapsulated in the SMTP e-mail message. The e-mail message may also include the identity of the serving DSM 106 and other information as described above. The e-mail message may be formed using e-mail client 124 and transmitted to an e-mail server 132 capable of spam filtering via DCM 104 (step 1112).

In step 1114, e-mail server 132 receives the e-mail-encapsulated SMS message and processes the message to determine whether it includes spam content. If the e-mail message is determined to include spam content (step 1116), e-mail server 132 may discard the message (step 1118). Otherwise, e-mail server 132 delivers, in step 1120, the e-mail-encapsulated SMS message to STP/SG 100. In step 1122, DCM 104 of STP/SG 100 receives and processes the e-mail message. In step 1124, SMS spam screening function 122 extracts the original SMS message from the e-mail message. The SMS message is subsequently routed to/towards the receiving party (step 1126). Alternatively, as discussed above, e-mail server 132 may include spam screening results with the e-mail message delivered in step 1120 and forward the e-mail message to STP/SG 100 for processing in accordance with the screening results. Based on the spam screening results, the e-mail message is either discarded or the encapsulated SMS message is reconstructed and forwarded to intended recipient 307 STP/SG. 100.

FIG. 12 illustrates an exemplary usage measurement and billing information table 1200 for tracking measurement- and billing-related information each time e-mail spam screening resources are used to screen an SMS message. For example, the time 1202 and sender/recipient information 1204 may be stored in measurement and billing information table 1200. This information may be used for billing purposes and/or to track senders of spam to take other corrective actions, such as blocking future messages from the sender, e.g., blacklisting the sender.

Although the examples described above relate to primarily to screening SMS messages, the subject matter described herein is not limited to screening SMS messages using e-mail spam filtering resources. For example, the methods, systems, and computer program products described herein may be used to screen any type of signaling messages containing media content, such as text content, audio content, image content, and/or video content. Examples of other types of messages that may be screened using the subject matter described herein include multimedia message service (MMS) messages, instant messages, and session initiation protocol (SIP) messages that carry media content. Exemplary SIP messages that may be screened using the subject matter described herein include SIP MESSAGE and INFO messages. The term "message service message," as used herein, is intended to refer to any non-email message type used to carry media content, including SMS messages, SIP messages, MMS messages, and IM messages.

Although the examples illustrated above in FIGS. 1 and 9 include a first communications module that sends and receives SMS messages and a second communications module that sends and receives e-mail messages, the subject matter described herein is not limited to using separate communications modules for sending and receiving SMS and e-mail messages. In an alternate implementation of the subject matter described herein, the functionality for sending and receiving SMS messages and sending and receiving email-encapsulated SMS messages may be combined without departing from the scope of the subject matter described herein.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for screening short message service (SMS) messages, the method comprising:
   (a) receiving, at a network element separate from an electronic mail (e-mail)-based spam filter, an SMS message that includes a short message payload;
   (b) creating, at the network element, an e-mail message that includes at least a portion of the SMS message; and
   (c) transmitting the e-mail message to the e-mail-based spam filter, wherein the e-mail-based spam filter determines whether the at least a portion of the SMS message contained in the e-mail message includes spam content, and wherein the method further comprises, in response to the determination by the e-mail-based spam filter that the at least a portion of the SMS message contained in the e-mail message does not include spam content, notifying the network element and routing the SMS message from the network element to its destination.

2. The method of claim 1 wherein receiving an SMS message includes receiving the SMS message at a network routing node.

3. The method of claim 1 wherein receiving an SMS message includes receiving the SMS message at a short message service center.

4. The method of claim 1 wherein creating an e-mail message that includes at least a portion of the SMS message includes creating an e-mail message that includes the SMS payload.

5. The method of claim 4 wherein creating an e-mail message includes storing the SMS payload information in a subject field of the e-mail message.

6. The method of claim 4 wherein creating an e-mail message includes storing the SMS payload body portion of the e-mail message.

7. The method of claim 1 wherein creating an e-mail message includes creating an e-mail message that is addressed to an e-mail address associated with the network element that creates the e-mail message.

8. The method of claim 1 comprising:
(a) receiving a message from the e-mail-based spam filter indicating that the SMS message does not include spam content;
(b) using at least a portion of the SMS message information contained in the e-mail message to reconstruct the SMS message; and
(c) wherein routing the SMS message to its intended destination includes routing the reconstructed SMS message to its intended destination.

9. A method for screening short message service (SMS) messages, the method comprising:
(a) receiving, at a network element separate from an electronic mail (e-mail)-based spam filter, an SMS message that includes short message payload information;
(b) storing the SMS message in a message buffer of the network element;
(c) creating, at the network element, an email message that includes at least a portion of the SMS message;
(d) transmitting the e-mail message to the e-mail-based spam filter, wherein the e-mail-based spam filter determines whether the at least a portion of the SMS message contained in the e-mail message includes spam content, and in response to the determination by the e-mail-based spam filter that the at least a portion of the SMS message contained in the e-mail message does include spam content, discarding the e-mail message; and
(e) at the network element, determining whether the e-mail message has been discarded, and, in response to determining that the e-mail message has been discarded, discarding the SMS message stored in the message buffer.

10. The method of claim 9 wherein creating an e-mail message includes creating an e-mail message that includes an identifier associated with a message processing module storing the SMS message.

11. The method of claim 9 wherein creating an e-mail message includes creating an e-mail message that includes an identifier associated with a storage location of the SMS message in the message buffer.

12. The method of claim 9 wherein creating an e-mail message includes creating an e-mail message addressed to an e-mail address associated with the network element that created the e-mail message.

13. The method of claim 9 comprising:
(a) receiving an e-mail message from the e-mail-based spam filter;
(b) using information contained in the e-mail message to extract the SMS message from the message buffer; and
(c) routing the SMS message.

14. A method for screening message service messages, the method comprising:
(a) receiving, at a network element separate from an electronic (e-mail)-based spam filter, a message service message that includes a payload;
(b) creating, at the network element, an email message that includes at least a portion of the message service message; and
(c) transmitting the e-mail message to the e-mail-based spam filter, wherein the e-mail-based spam filter determines whether the at least a portion of the message service message contained in the e-mail message includes spam content, and wherein the method further comprises, in response to the determination by the e-mail-based spam filter that the at least a portion of the message service message contained in the e-mail message does not include spam content, notifying the network element and routing the message service message from the network element to its destination.

15. The method of claim 14 wherein receiving a message service message includes receiving a multimedia message service (MMS) message.

16. The method of claim 14 wherein receiving a message service message includes receiving a session initiation protocol (SIP) message carrying media content.

17. The method of claim 14 wherein receiving a message service message includes receiving an instant message.

18. A network element for preventing the delivery of unwanted short message service (SMS) messages to a receiving party, the network element comprising:
(a) at least one communications module for sending and receiving SMS messages and for sending and receiving electronic mail (e-mail) messages; and
(b) an SMS message screening function separate from an e-mail message filtering application and for:
(i) receiving an SMS message from the at least one communications module;
(ii) creating a first e-mail message that includes at least a portion of the SMS message;
(iii) forwarding the first e-mail message to the e-mail message filtering application via the at least one communications module;
(iv) receiving a second e-mail message from the e-mail message filtering application via the at least one communications module;
(v) reconstructing an SMS message from information contained in the second e-mail message; and
(vi) forwarding the SMS message from the SMS screening function to a message recipient via the at least one communications module.

19. The network element of claim 18 wherein elements (a) and (b) are components of a signal transfer point (STP).

20. The network element of claim 18 wherein elements (a) and (b) are components of a signaling gateway (SG).

21. The network element of claim 18 wherein elements (a) and (b) are components of a short message service center.

22. The network element of claim 18 wherein the at least one communications module comprises a signaling system 7 (SS7) link interface module (LIM) for sending and receiving the SMS messages and a data communications module for sending and receiving the e-mail messages.

23. The network element of claim 18 wherein the at least one communications module includes an IP data communications module for sending and receiving the SMS messages and the e-mail messages.

24. The network element of claim 18 including a usage measurements and billing database for maintaining statistics, generating usage reports, and generating bills associated with SMS messages that are processed by the SMS message screening function.

25. A network element for preventing the delivery of unwanted short message service (SMS) signaling messages to a receiving party, the network element comprising:
(a) at least one communications module for sending and receiving SMS messages and for sending and receiving electronic mail (e-mail) messages; and
(b) an SMS message screening function separate from an e-mail message filtering application and for:
(i) receiving an SMS message from the at least one communications module;
(ii) storing the SMS message in a message buffer;
(iii) creating a first e-mail message that includes at least a portion of the SMS message;
(iv) forwarding the first e-mail message to the e-mail message filtering application via the at least one communications module;
(v) receiving a second e-mail message from the e-mail message filtering application via the at least one communications module;
(vi) locating and extracting the SMS message from the message buffer using information contained in the second e-mail message; and
(vii) forwarding the SMS message from the SMS screening function to a message recipient via the at least one communications module.

26. The network element of claim 25 wherein elements (a) and (b) are components of a signal transfer point (STP).

27. The network element of claim 25 wherein elements (a) and (b) are components of a signaling gateway (SG).

28. The network element of claim 25 wherein elements (a) and (b) are components of a short message service center (SMSC).

29. The network element of claim 25 wherein the at least one communications module comprises a signaling system 7 (SS7) link interface module (LIM) for sending and receiving the SMS messages and a data communications module for sending and receiving the e-mail messages.

30. The network element of claim 25 wherein the at least one communications module includes an IP data communications module for sending and receiving the SMS messages and the e-mail messages.

31. The network element of claim 25 including a usage measurements and billing database for maintaining statistics, generating usage reports, and generating bills associated with SMS messages that are processed by the SMS message screening function.

32. The network element of claim 25 wherein the SMS message screening function is adapted to discard the stored SMS message if an e-mail related to the buffered SMS message is not received within a predetermined time period.

33. A telecommunications network element comprising:
(a) a communications module for receiving a message service message including message service content; and
(b) a message service screening function separate from an electronic mail (e-mail)-based spam filter and operatively associated with the communications module for generating an e-mail message including at least a portion of the message service message content and forwarding the e-mail message to the e-mail-based spam filter, wherein the e-mail-based spam filter determines whether the at least a portion of the message service message contained in the e-mail message includes spam content, and wherein the telecommunications network element, in response to the determination by the e-mail-based spam filter that the at least a portion of the message service message contained in the e-mail message does not include spam content, routes the message service message from the telecommunications network element to its destination.

34. The telecommunications network element of claim 33 wherein the e-mail message is addressed to an e-mail address associated with the message service screening function.

35. The telecommunications network element of claim 33 wherein the message service screening function is adapted to examine receiving party information in the message service message and determine whether SMS screening is required and to generate the e-mail message only in response to determining that message service screening is required.

36. The telecommunications network element of claim 33 wherein the message service screening function is adapted to include receiving party information in the e-mail message and to send the e-mail message without determining whether screening functionality is enabled for the receiving party.

37. The telecommunications network element of claim 33 wherein the message service message comprises a multimedia message service message.

38. The telecommunications network element of claim 33 wherein the message service message comprises a session initiation protocol (SIP) message carrying media content.

39. The telecommunications network element of claim 33 wherein the message service message comprises an instant message.

40. A computer program product comprising computer-executable instructions embodied in a computer-readable storage medium for performing steps comprising:
(a) receiving, at a network element separate from an electronic mail (e-mail)-based spam filter, an SMS message that includes a short message payload;
(b) creating, at the network element, an email message that includes at least a portion of the SMS message; and
(c) transmitting the e-mail message to the e-mail-based spam filter, wherein the e-mail-based spam filter determines whether the at least a portion of the SMS message contained in the e-mail message includes spam content, and wherein the computer program product further comprises, in response to the determination by the e-mail-based spam filter that the at least a portion of the SMS message contained in the e-mail message does not include spam content, notifying the network element and routing the SMS message from the network element to its destination.

* * * * *